Patented Mar. 18, 1947

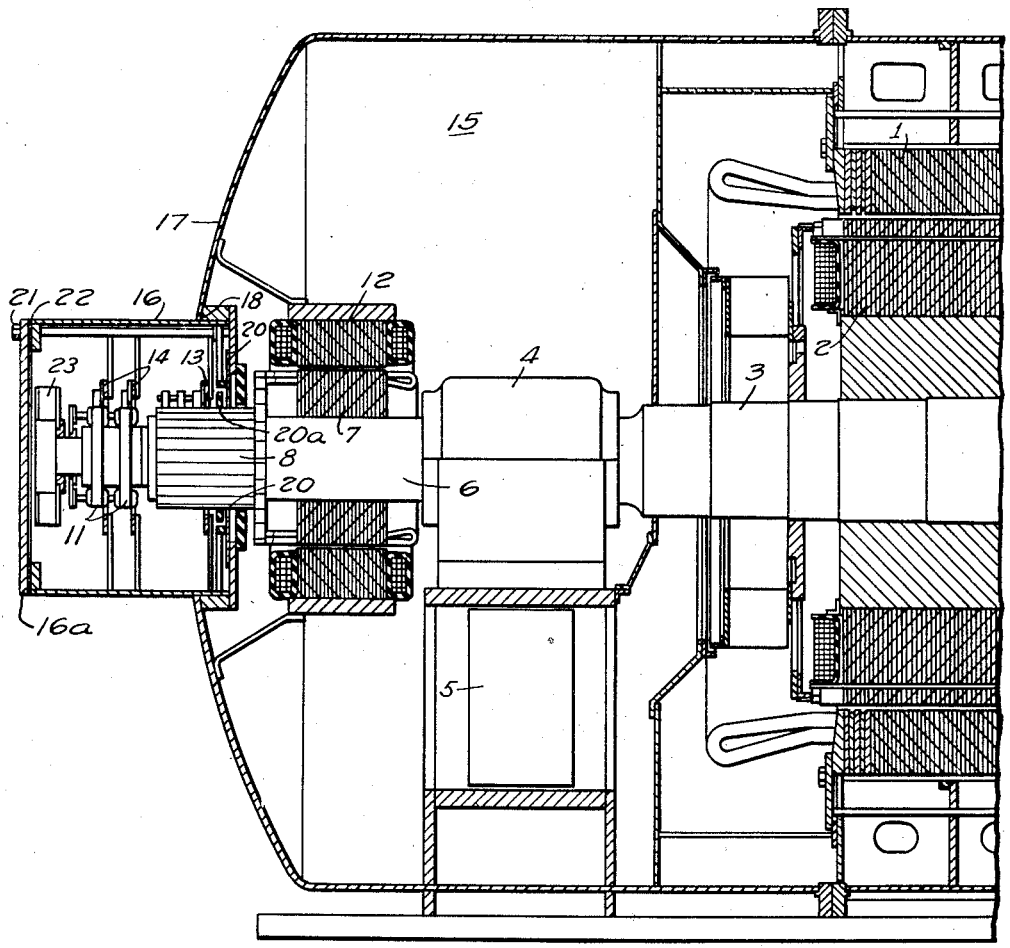

2,417,783

UNITED STATES PATENT OFFICE 2,417,783

HYDROGEN COOLED MACHINE HAVING DIRECT CONNECTED EXCITER WITH SEPARATELY HOUSED BRUSH RIGGING

Ernest I. Pollard, Wilkinsburg, and Arthur M. Harrison, Swissvale, Pa., assignors to Westinghouse Electric Corporation, East Pittsburgh, Pa., a corporation of Pennsylvania Application August 18, 1945, Serial No. 611,417

2 Claims. (Cl. 171—252)

Our invention relates to the use of a direct-connected exciter which is enclosed in the hydrogen-filled housing of a hydrogen-cooled synchronous condenser or generator or other synchronous dynamo-electric machine.

Heretofore two different arrangements have been provided, by different manufacturers, for exciting the rotating field-members of hydrogen-cooled synchronous condensers or generators.

In one previously known arrangement, the slip rings or collectors of the main machine are enclosed in an openable auxiliary hydrogen-filled compartment, which is in communication with the interior of the housing of the main machine when the machine is in operation, but which is sealed off by means of a seal which can be caused to tightly grip the shaft before opening up the small auxiliary collector-enclosing space for the purpose of gaining access to the collector brush-rigging. Current is led into the collector from an exciter which is outside of the hydrogen-filled housing of the main machine. This arrangement has the advantage of requiring only a small loss of hydrogen, when access must be had to the collector, but it has the disadvantage of requiring an exciter which cannot be direct-mounted on the shaft of the main machine.

The other previously known arrangement utilized a direct-connected exciter, which is to say that the exciter was hydrogen-cooled, being enclosed in the hydrogen-filled space which is enclosed by the main housing. In this arrangement, the entire exciter, including the exciter-rotor, the exciter-frame, and the exciter-commutator, as well as the collector of the main machine, and the respective brush-riggings, were enclosed in a small auxiliary housing compartment which is normally in communication with the hydrogen of the main enclosure, while the machine is running, but having a seal which may be sealed tightly against the shaft so as to seal off this auxiliary space when access is necessary to the collector or commutator. This arrangement has the disadvantage of requiring a relatively large auxiliary chamber, which wastes considerable hydrogen when it must be opened up to the atmosphere. It also has a secondary disadvantage in subjecting the windings of the exciter to the deposition of carbon-dust from the brush-riggings.

An object of our present invention is to provide a new form of arrangement, in which the exciter is direct-connected and hydrogen-cooled, but the auxiliary chamber for providing access to the brush-riggings encloses only the two brush-riggings, with a seal which is disposed around the back end of the exciter-commutator, between the exciter-brushes and the commutator-necks. This arrangement necessitates a slight increase in the length of the exciter-commutator, to make room for the seal, but it has the advantage of requiring a much smaller volume of the auxiliary chamber, which does not have to surround the entire exciter, and it has the additional advantage of more or less confining the carbon-dust to the auxiliary chamber surrounding the brush-riggings, because, although the seal is not tight while the machine is operating, it does, nevertheless, materially impede the circulation of hydrogen between the auxiliary chamber and the larger main chamber of the condenser, so that the dust-laden gas is largely confined to the auxiliary chamber which encloses the brush-riggings. Since the seal does not normally make contact with the rotating surface of the commutator, when the machine is running, no damage to the commutator results, as the seal does not clamp sufficiently tightly around the commutator to damage the same, when the machine is shut down for access to the brush-rigging.

In the accompanying drawing, the single figure is a longitudinal sectional view of the exciter-end of a hydrogen-cooled synchronous condenser embodying our invention in an illustrative preferred form of embodiment.

The main machine is illustrated as a synchronous condenser comprising a stationary armature-member 1 and a rotating field-member 2 having a rotatable shaft 3. Since the drawing shows only the front end of the machine, only the front bearing 4 is shown, for supporting the shaft, but it will be understood that a similar bearing is provided at the rear end. This bearing is illustrated as a pedestal-mounted bearing, having a cooler 5 disposed in the pedestal, for cooling the main machine.

The shaft 3 has a front shaft-end 6, extending in front of the front bearing 4. Mounted on this shaft-end 6 is an exciter armature 7 which is adjacent to the front bearing 4. An exciter-commutator 8 is also mounted on said shaft-end 6, in front of said exciter-armature 7, said exciter-armature having commutator-necks at the rear end thereof, adjacent to the armature 7. On the end of the shaft-end 6, in front of the exciter-commutator 8, the shaft-end carries a pair of slip rings, which comprise the collector 11 for the synchronous machine. A stationarily supported exciter-frame or field-member 12 cooperates with the exciter-armature 7, a stationarily supported brush-rigging 13 cooperates with the commutator, and a stationarily supported brush-rigging 14 cooperates with the collector.

The main machine has a hydrogen-fillable gas-tight housing 15 for enclosing said stationary armature-member 1 of the main machine, said exciter-field 12, and both of said brush-riggings 13 and 14. The housing 15 is described as being hydrogen-fillable, because the machine is commonly shipped, by the manufacturer, without the hydrogen-filling, the hydrogen being supplied by the purchaser after the installation of the machine.

We provide an auxiliary gas-tight housing-means 16, for enclosing the two brush-riggings 13 and 14. While we are not limited to any particular form or shape of auxiliary housing 16, we prefer to provide the same in the shape of a small housing-portion 16 which extends beyond the front of the end-wall 17 of the main housing 15, the small housing-portion being secured gas-tightly to front end-wall 17. The end-wall 17 of the main housing 15 terminates in an opening 18 which surrounds the rear end of the exciter-commutator 8, between the exciter-brushes 13 and the commutator-necks 9. Secured within this opening 18 is a gas-seal 20 of a type which is not gas-tight when the machine is running, and which is arranged to be made gas-tight when the machine is shut down.

It is necessary for the portion of the housing near the brush-riggings 13 and 14 to be openable in some way, to provide access to the space containing the brush-riggings. In the illustrated form of my invention, where the auxiliary housing 16 consists of a small protruding housing, the end-plate 16a of the auxiliary housing 16 can be removed from its gas-tight connection with the rest of the auxiliary housing, by removable connections 21, which are arranged, in a known manner, in such a way that the gas-seal 20 is let up into gas-tight clamping-engagement with the rotating member, or against the side of a flange 20a on the rotating member, before the seal is broken at the gasket 22 between the end-plate 16a and the auxiliary housing 16.

We have already described the advantages of our invention, which permit the machine to be first shut down, after which the gas-seal 20 can be let down tightly against the commutator 8, thus sealing off the space within the auxiliary housing 16, and making it possible then to open up the auxiliary housing for providing access to the brush-riggings, without letting the hydrogen out of the main housing-space. When the machine is in normal operation, the gas-seal 20 is not in contact with the commutator 8, and hence is not gas-tight, but it nevertheless restricts the amount of hydrogen which circulates underneath the seal, so that the dust-laden gas of the brush-rigging is largely confined to space within the auxiliary housing 16, and is thus prevented from forming carbon-deposits on the windings of either the exciter or the main machine. The space within the auxiliary housing 16 may be ventilated by means of a blower 23 on the end of the shaft-end 6.

We claim as our invention:

1. A hydrogen-cooled synchronous dynamo-electric machine comprising a stationary armature-member, a rotating field-member having a rotatable shaft, a front bearing and a rear bearing supporting the respective ends of the shaft, said shaft having a front shaft-end extending in front of said front bearing, an exciter-armature mounted on said shaft-end adjacent to said front bearing, an exciter-commutator mounted on said shaft-end in front of said exciter-armature, said exciter-commutator having commutator-necks at the armature-end thereof, and a collector for said synchronous machine mounted on said shaft-end in front of said exciter-commutator, a stationarily supported exciter-field cooperating with said exciter-armature, stationarily supported brush-rigging for said commutator, and stationarily supported brush-rigging for said collector, a hydrogen-fillable gas-tight housing for said machine, enclosing said stationary armature-member, said exciter-field, and both of said brush-riggings, the portion of said housing near said brush-riggings being operable to provide access thereto, and auxiliary gas-tight housing-means including a gas-seal surrounding the exciter-commutator between the commutator-necks and the commutator brush-rigging for causing the exciter-field, the exciter-armature and the front bearing to be included in the main housing-chamber which encloses the synchronous machine, said gas-seal being of a type which is not gas-tight when the machine is running and which is arranged to be made gas-tight when the machine is shut down.

2. A hydrogen-cooled synchronous dynamo-electric machine comprising a stationary armature-member, a rotating field-member having a rotatable shaft, a front bearing and a rear bearing supporting the respective ends of the shaft, said shaft having a front shaft-end extending in front of said front bearing, an exciter-armature mounted on said shaft-end adjacent to said front bearing, an exciter-commutator mounted on said shaft-end in front of said exciter-armature, said exciter-commutator having commutator-necks at the armature-end thereof, and a collector for said synchronous machine mounted on said shaft-end in front of said exciter-commutator, a stationarily supported exciter-field cooperating with said exciter-armature, stationarily supported brush-rigging for said commutator, and stationarily supported brush-rigging for said collector, a hydrogen-fillable gas-tight housing for said machine, enclosing said stationary armature-member, said housing including a main housing-portion the front of which encloses said exciter-field and terminates in a gas-seal surrounding the exciter-commutator between the commutator-necks and the commutator brush-rigging for causing the exciter field, the exciter-armature, and the front bearing to be included in the main housing-chamber which encloses the synchronous machine, said gas-seal being of a type which is not gas-tight when the machine is running and which is arranged to be made gas-tight when the machine is shut down, and a small housing-portion secured gas-tightly to the front end of the main housing-portion for providing a gas-tight completion of the housing while the machine is running, said small housing-portion enclosing both of the brush-riggings and being openable to provide access thereto.

ERNEST I. POLLARD.
ARTHUR M. HARRISON.